INVENTOR.
Donald E. Yadon
BY

ATTORNEYS

INVENTOR.
Donald E. Yadon

Feb. 26, 1963

D. E. YADON 3,078,943

STEERABLE DRIVE WHEEL

Filed Jan. 11, 1960

INVENTOR.
Donald E. Yadon
BY
McGraw and Edwards
ATTORNEYS ated an assembly of parts according to my invention,
United States Patent Office 3,078,943
Patented Feb. 26, 1963

3,078,943
STEERABLE DRIVE WHEEL
Donald E. Yadon, Littleton, Colo., assignor to The American Coleman Company, Littleton, Colo., a corporation of Nebraska
Filed Jan. 11, 1960, Ser. No. 1,535
19 Claims. (Cl. 180—48)

This invention relates to improvements in steerable drive wheel mountings and supporting structure.

The importance of four wheel drive for heavy duty vehicles has long been appreciated and extensively employed. Steerable front wheel drives for pleasure-type vehicles is currently being given increased attention. Steerable rear drive wheels are more commonly used to facilitate movement of large, heavy vehicles.

Steerable front or rear wheel drives are normally, and of necessity, of complicated construction and such structures must not only be strong enough for suitable attachment and support of wheels, but must include the functions of efficient steering and power transmission. The structures must, also, include suitable braking means, and all parts must be incorporated into a single relatively small structure.

One of the major areas of concern in designing such units has been the provision of means for alinement of the wheel with axle shaft, i.e. an "axle stub." The "axle stub," in the past, has been a separate part bolted onto the axle housing, but in my novel construction, it is a part or extension of the axle casting, thus eliminating weakness at a point of joinder. Previously, the alinement and adjustment of pivot bearings associated with the steerable mountings has been accomplished by a clamp ring, tapered wedge and pivot bearing cup, such as shown for example, in Patent No. 2,346,842; or by a system of tapered wedges, individually adjustable set screws or a combination of a plurality of individually adjustable components selected from the foregoing. Furthermore, most of the prior art arrangements provide individual adjustment of the pivot bearings on only one side at a time, thus causing a problem of wheel mount concentricity. In my novel combination, alinement and adjustment is made by tightening movement of a single component against and into association with novel opposed pivot bearing supports, thus effecting a centering and alinement of the wheel supports, adjustment of the pivot bearing and fixing of those components into a rotational operating configuration to properly support wheels mounted thereon. Proper alinement of drive wheel support configurations is necessary in order to overcome the undesirable results of wear and necessary maintenance for effective and economical operation.

Furthermore, by my novel construction, the axle shaft bushing is incorporated into the foregoing components as an integral part, thereby further reducing the cost of production. This arrangement provides a precise alinement of the shaft with the pivot shearing supports, while increasing the efficiency and strength of the simplified design. Also, the power yoke is splined to the axle shaft permitting the modification of the power yoke to provide for free wheeling of the front axle shaft, i.e., to permit the front axle shaft and differential to be disengaged from the front wheel. This eliminates the turning of the differential parts and propeller shaft parts providing longer service for those parts and also eliminating the loss of horsepower and torque in turning the gearing associated with those parts.

The invention includes a novel construction of a wheel support housing providing a brace or spoke for such housing, effectively supporting the housing through its circumferential extent. The combination provides a pressure lubrication system for the radial and pivot bearing sets of the wheel structure. This lubrication system reduces maintenance and aids in keeping dirt and dust out of the bearing systems.

Therefore, it is among the objects and advantages of my invention to provide improved component construction for steerable drive wheel supports.

It is a further object and advantage of my invention to provide a novel pivot bearing support system and adjustment for use with steerable vehicle wheel drives.

It is also an object of my invention to provide a simplified arrangement of parts for steerable vehicle device wheel supports which includes a supporting spoke and provides means for a pressure lubrication system.

It is another object of my invention to provide a novel means for mounting pivot bearing supports and the bearings carried thereby in easily alined and adjustable relation.

It is a still further object of my invention to provide a combination of parts which may be alined and adjusted by the axial tightening movement of a single tightening means.

It is yet another object of my novel combination to provide a novel housing and pivot bearings and means of adjustment therefor whereby a simple, strong and inexpensive steerable front wheel drive construction for vehicles capable of simple and accurate alinement and adjustment is achieved.

A further object of the invention is a simplified axle housing construction arranged to support the wheel braking mechanism in an accessible position, reducing manufacturing costs and installation and maintenance costs.

Still further objects and advantages will become readily apparent from a study of the description hereafter with reference to the appended drawings, in which.

Figure 1:
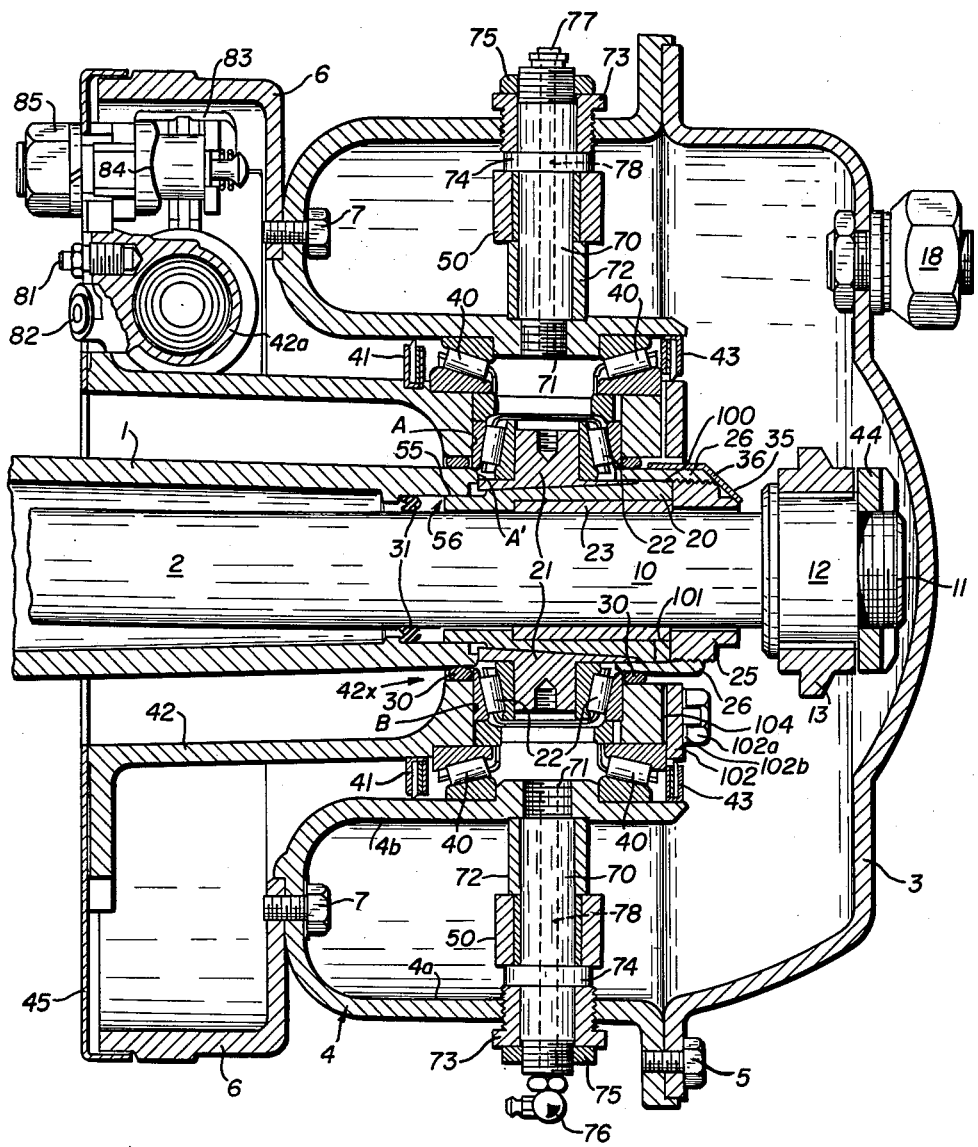
FIG. 1 is a side sectional elevation of an end of a steerable drive wheel construction.

Referring now in more detail to FIG. 1, there is illustrated an assembly of parts according to my invention, in which an axle housing 1 has telescoped therein an axle shaft 2. The axle 2 is interconnected with a differential (not shown). A spindle 42 is pivotally mounted on the housing 1, providing turning movement for a wheel, as explained below. A housing 4 is rotatably mounted on the spindle 42 by radial bearing sets 40. A cover plate 3 is secured to the housing 4 by means of bolts and nuts 5 spaced around the periphery of the housing. A brake drum 6 is mounted on the housing 4 by means of bolts 7. The cover 3 encloses the components of wheel support and provides a base for the attachment of vehicle wheels (not shown) as by wheel lugs 18.

A wedge member 20 telescopes into the end of the axle housing, and bearing portion 55 is piloted into annular recess 56 in the axle housing. Bearing portion 100 is piloted into annular recess 101 at the outer end of the axle housing. Both recesses have complementary surfaces for the bearing portions of the wedge, providing alinement of the wedge in the axle housing.

A shaft extension 10 is secured to axle shaft 2, and the outer end of the shaft extension includes a splined portion 12 for supporting a power yoke 13 (described below) and a threaded outer end 11. An annular "Oilite" or other suitable bushing 23 is mounted internally of the wedge member supporting the shaft extension for rotation in the housing. The shaft extension 10 has a threaded portion 11 carrying splined means 12 for attachment of the internally splined power yoke 13 in a fixed and operative relationship with the shaft. The bolt 18 is intended as illustrative of means to mount a wheel although a wheel is not shown.

A single externally threaded wedge nut 25 is mounted by threaded engagement with the interior substantially peripheral portion 26 of the housing 1. This nut 25 (shown best in FIG. 3) bears against the wedge member tending to force it axially into the housing. A lock cap 35, secured in position by bolts 80, holds the nut 25 in a predetermined position by ears 36 binding the grooves 37 on the nut.

Mounted on opposite sides of the wedge member 20, and passing through an axle housing aperture such as A', is a pivotal bearing support 21 on which is mounted pivot bearing sets 22. These bearing sets are mounted in spindle apertures A and B. The spindle 42 is mounted on the bearing sets 22 so that it pivots about the bearing supports for turning movement of the wheel. Adjustment of the pivot bearings is provided by axial movement of the wedge member 20 in response to movement of the nut 25.

The shaft 10 is sealed to the housing 1 by means of a chevron seal 31 which prevents leaking of lubrication grease from the differential into the wheel housing. O-ring seals 30 mounted around bearings 22 between the axle housing 1 and the spindle 42 enclose the pivot bearing compartment preventing the entrance of dust, dirt, and, further, providing a seal so that the bearings may be retained in lubricant under pressure.

The brake drum 6 and the housing 4 rotate around spindle 42 on radial bearings 40 mounted between the housing 4 and the spindle 42. The spindle is pivotally secured to housing 1 for turning movement of wheel support housing 4. The spindle 42 and housing 1 thus remain stationary. An interior grease seal 41 and exterior grease seal 43 are suitably placed to assure retention of the bearing lubricant of the device.

A pair of opposed hollow shouldered pins 70 are threadedly engaged with threaded holes 71 and provide a passage from the exterior of housing 4 to radial bearings 40. A spacer or sleeve 72 maintains a predetermined spacing for ring 50 and prevents the ring from distorting out of round. A nut 73 threadedly engaged with the outer tubular member 4a of housing 4 bears against a shoulder 74 on the pin. When pulled tight the nut 73 bears against shoulder 74 of pin 70 which in turn bears against inner tubular member 4b of housing 4. A lock nut 75, engaging the threaded outer end of the pin 70, is pulled down against nut 73 providing a spoke between the inner and outer tubular members of housing 4. The spokes provide reinforcement of the housing against compression as well as tension or pull. The shoulder 74 of pin 70 in conjunction with the nut 73 prevents the outer member from moving toward the inner member under compressive forces. Since the pin 70 is threaded into the inner tubular member and held to the outer tubular member by nut 73 and lock nut 75, movement apart of the two members is resisted. These two spokes provide sufficient reinforcing whether the distortion forces are adjacent to them or not since they resist any movement between the inner and outer tubular members. The circular construction causes distribution of distortion movements around the rings and the spokes resist such distortion.

A grease fitting 76 is mounted on one end of pin 70, and a pressure rupture seal 77 is mounted on the other end. Passages 78 in the pins 70 communicate with the bearing chambers for application of lubricant. The bearing chambers are sealed, as explained above, by seals 41 and 43 and by O-rings 30. Lubricant may be retained under pressure in the bearing chambers, which is a positive seal against the entrance of dust, dirt and moisture into these chambers. Thus a single grease fitting provides lubrication for both sets of bearings of each wheel assembly.

An actuating hydraulic cylinder 42a is mounted on the spindle 42, and passages 81 and 82 provide communication means for hydraulic lines and the like for control of the braking mechanism. Brake bands 83 are mounted on linking mechanism 84 which is supported on the spindle. The dust shield 45 merely covers the opening and is held in place by nut and bolt assemblies 85. Thus the braking mechanism is carried by the spindle rather than the dust cover 45. The spindle throat 42x is closed around the axle housing by O-ring 30, providing a further simplified structure.

Figure 3:
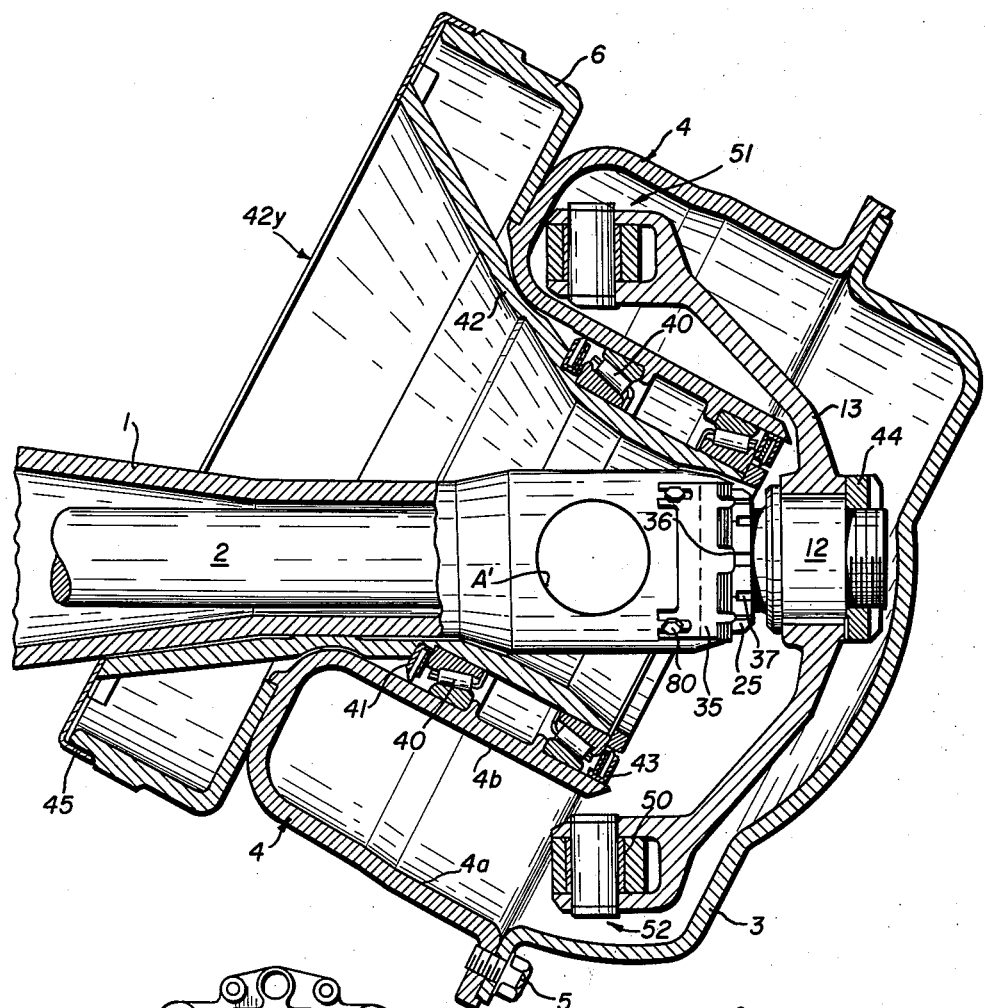
FIG. 3 is a partially schematic top sectional view of the apparatus of FIG. 1 in turning position.

In operation, the main housing 4 rotates around the axle shaft and spindle and braking means. Suitable locking means, such as nut 44, is used to complete the assembly and hold the power yoke 13 on the splined member 12. The spindle 42 is pivotally connected with the main housing 4 to give steering action. The opening in the spindle is an elongated oval which permits movement through the wheel turning angle, one angle of which is shown in FIG. 3.

Figure 2:
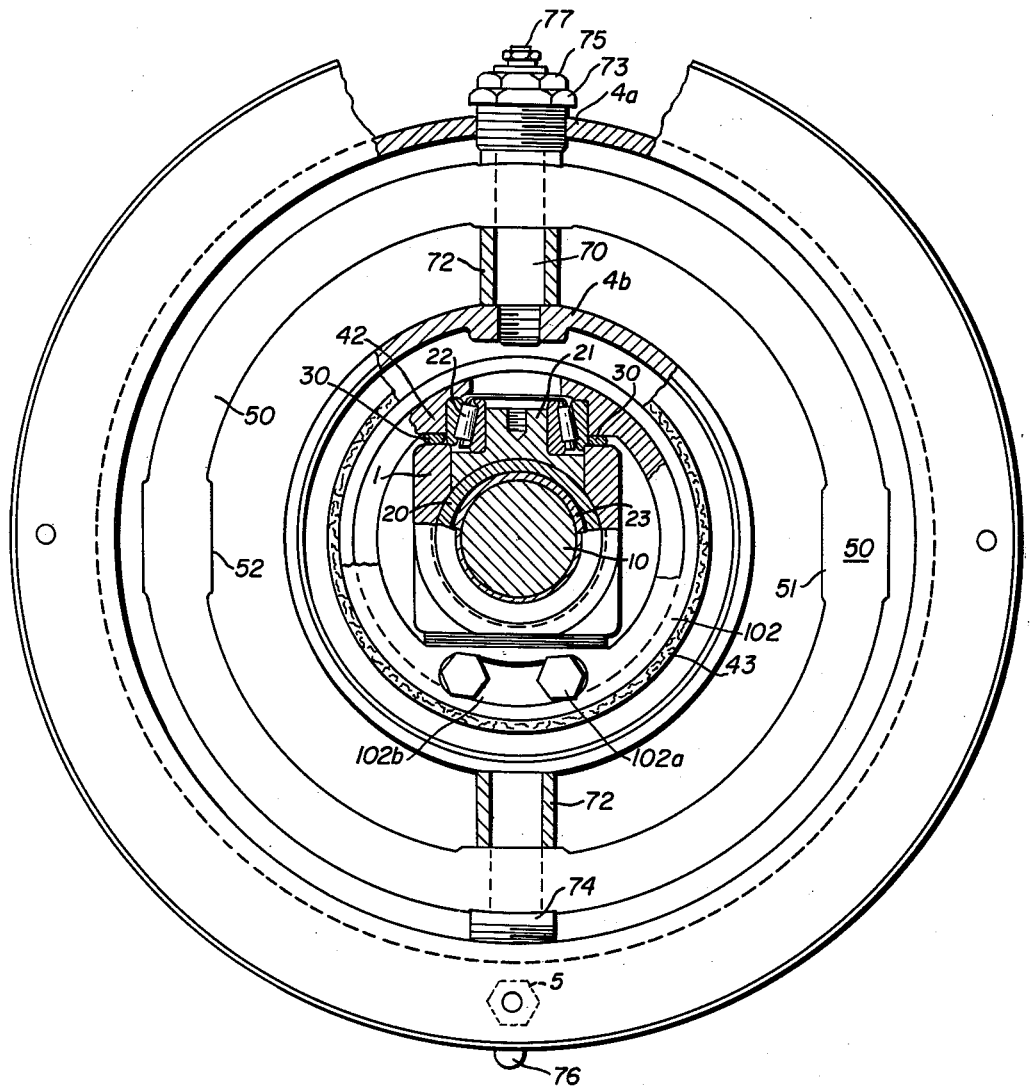
FIG. 2 is a partially schematic end view, with the cover removed, partially broken away.
Figure 9:
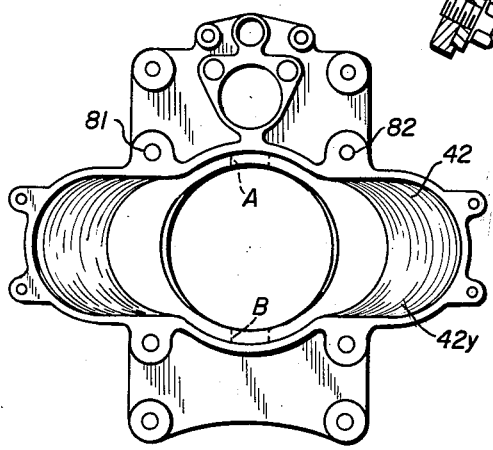
FIG. 9 is an end elevation, in reduced size, of a spindle according to the invention.

In FIG. 2 the arrangement of parts and the manner in which the pivot bearing supports seat on wedge member 20 are shown. Ring 50 is pivotally mounted on the pins 70 and is suitably attached to the power yoke 13 at the sides 90° to pins 70, although the power yoke is not shown as attached in this view for the sake of clarity. The power yoke, FIG. 3 is, however, pivotally connected at points 51 and 52 on the ring. In a turning position the housing 4 is shown in relation to the power yoke and ring. The yoke and ring operate as a universal joint to provide power for running during turns or straight away operations. The top plan view of FIG. 3 (and also FIG. 9) clearly shows the elongated opening 42y in spindle 42 to provide pivotal action.

Figure 4:
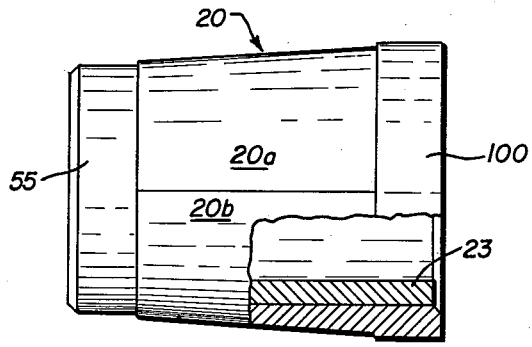
FIG. 4 is an end view in partial section of a novel wedge means for supporting pivot bearings.
Figure 5:
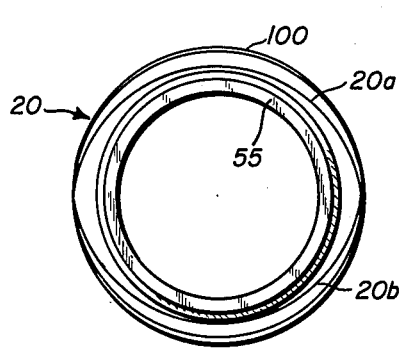
FIG. 5 is an end view of the device of FIG. 4.
Figure 6:
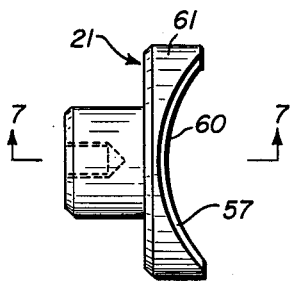
FIG. 6 is a side view of a pivot bearing support according to the invention.
Figure 7:
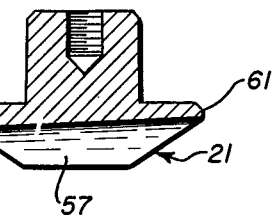
FIG. 7 is a side sectional view along the line 7—7 of the device of FIG. 6.
Figure 8:
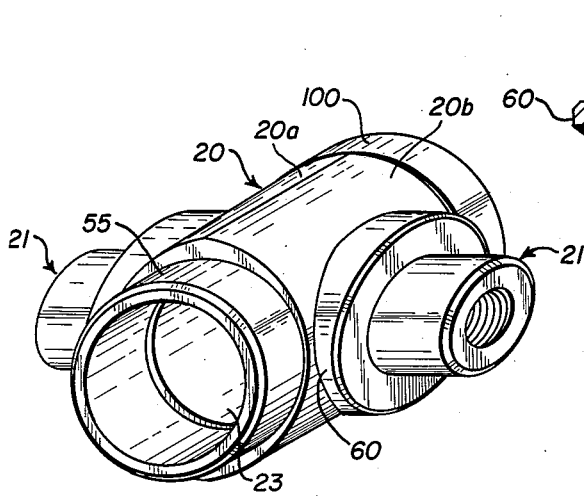
FIG. 8 is an isometric view of the wedge and bearing supports in operative position.

The pivot bearing support assembly is shown in FIGS. 4–8, with the means for supporting the bearings mounted in position on the wedge. The side view of FIG. 4 shows the mounting of the "Oilite" bearing (e.g. a permanently lubricated bearing) in the wedge member. When assembled in the axle housing, annular surfaces 55 and 100 pilot into accommodating grooves in the housing. The wedge member is a tight fit in the housing but slides inwardly under the influence of the adjusting nut. The eccentric convex nature of the outer surface of the wedge is illustrated in FIG. 5. Matching inner surfaces of the bearing supports 21 saddle on the surface and movement along the wedge surfaces 20a and 20b moves the bearing supports laterally toward and away from the centerline of the wedge member. The concave surface 57 of the wedging bearing supports taper from the edge 60 to the edge 61 (FIG. 7) to saddle the surfaces 20a and 20b as shown in FIG. 8. When assembled, the pivot bearings are supported in one position with respect to the axial direction of the wedge centerline, but may move inwardly and outwardly. Thus the bearing supports saddle on the wedge member and the concave surface of the supports fit snugly on the eccentric wedging surfaces 20a and 20b of the wedge member providing a steady support for the bearings. This arrangement permits easy adjustment and alinement of the wheel.

In summary, the assembly of the device is simply and easily accomplished as follows. Pivot bearings 22 are mounted on the bearing supports or holders 21 and these two units installed in housing 1. The O ring seals 30 are placed around the bearings, and the spindle with the braking components installed is mounted over the housing. The wedge member 20 is telescoped in the housing bearing against the pivot bearing supports and expands them radially without axial movement. The nut 25 and lock plate are installed to hold the assembly. The radial wheel bearings 40 are installed and seals 41 and 43 positioned on either side. The drum 4 and attached brake drum are mounted for rotation on the spindle. Bearing adjustment shims 104 and pressure plate 102 are held in place by bolts 102a on plate 102b mounted to retain the hub or housing 4 on the spindle with proper radial bearing adjustment pressure. The axle 2 is inserted through wedge member 20, and the power yoke and compensating or drive ring 50 are mounted in position. The yoke is fitted on the splined portion 12 and is held in place by nut 44. Spacers 72 are positioned between the ring 50 and the hub and pins 70 installed. The bushing or nut 73 is then threaded into the outer member of the hub and pulled down tight on the inner member of the hub. The ring 50 is thus free to pivot on the pin but is prevented from collapsing by the spacers 72. Lock nuts 75 complete the spoke assembly, and the grease fitting and seal are mounted on the pins. The wheel cover 3 is secured in position and the dust cover 45 completes the enclosure. Disassembly is the reverse procedure. It is thus apparent adjustment and wheel alinement are accomplished during the assembly with no additional adjustment necessary until wear occurs.

Having thus described one manner and mode of practicing my inventive concept, I wish it understood that I do not desire to be limited thereby, but rather by the scope of the appended claims.

I claim:

1. In a steerable vehicle wheel assembly having an axle housing enclosing an axle, a spindle mounted over an end portion of said housing, a wheel support drum rotatably mounted on the spindle and arranged in driving connection with the axle, said spindle being supported on pivot bearing means for steering movement about a substantially vertical axis, the improvement which comprises a wedge member telescoped in said housing and arranged for limited axial movement, said wedge member including opposed eccentric surfaces, and opposed supports for said pivot bearing means mounted in said housing inclusive of complementary surfaces seated on said eccentric surfaces such that axial movement of the wedge member causes alined seating and adjustment of the opposed supports and pivot bearing carried thereon, and means mounted for selective positioning on the axle housing cooperatively associated with the wedge member for causing axial movement thereof for alined seating and adjustment.

2. In a steerable vehicle wheel assembly having an axle housing for enclosing an axle, a spindle mounted over an end portion of said housing, a wheel support drum rotatably mounted on the spindle and arranged in driving connection with the axle, said spindle being supported on pivot bearing means for steering movement about a substantially vertical axis, the improvement which comprises a wedge member telescoped in said housing and arranged for limited axial movement, said wedge member including opposed eccentric surfaces of outwardly directed increasing dimensions, and opposed supports for said pivot bearing means mounted in said housing inclusive of complementary surfaces seated on said eccentric surfaces such that axial movement of the wedge member causes alined seating and adjustment of the opposed supports and pivot bearing carried thereon, and means mounted for selective positioning on the axle housing cooperatively associated with the wedge member for causing axial movement thereof for alined seating and adjustment.

3. In a steerable vehicle wheel assembly having an axle housing enclosing an axle, a spindle mounted over an end portion of said housing, a wheel support drum rotatably mounted on the spindle and arranged in driving connection with the axle, said spindle being supported on pivot bearing means for steering movement about a substantially vertical axis, the improvement which comprises a wedge member telescoped in said housing and arranged for limited axial movement, said wedge member including opposed eccentric surfaces, and opposed supports for pivot bearing means mounted in said housing and axially stationary with respect to said housing and radially movable therein, said opposed supports including complementary surfaces seated on said eccentric surfaces such that axial movement of the wedge member causes radial movement of the pivot bearing means into alined seating and adjustment, and means mounted for selective positioning on the axle housing cooperatively associated with the wedge member for causing axial movement thereof for alined seating and adjustment.

4. A steerable vehicle wheel assembly, an axle housing, an axle mounted in said axle housing, a spindle mounted on an end of said housing for steering movement about a substantially vertical axis, a wheel support structure rotatably mounted on the spindle and arranged in driving connection with the axle, a wedge member mounted in said axle housing and arranged for limited axial movement, said wedge member being supported in said housing on two annular bearing surfaces adjacent the ends thereof, an axle bearing mounted in said wedge member, opposed supports including pivot bearing means seated on said wedge member and mounted in said spindle supporting the same for pivotal movement about said housing, said wedge member including opposed eccentric surfaces of wedging characteristics in relation to said supports such that axial movement of the wedge member causes alined seating and adjustment of the pivot bearings in said spindle, and means mounted for selective positioning on the axle housing cooperatively associated with said wedge member for causing axial movement thereof for said alined seating and adjustment.

5. A steerable vehicle wheel assembly, an axle housing, an axle mounted in said axle housing, a spindle mounted on an end of said housing for steering movement about a substantially vertical axis, a wheel support drum rotatably mounted on the spindle and arranged in driving connection with said axle, a wedge member mounted in said axle housing and arranged for limited axial movement, said wedge member being supported in said housing on two annular bearing surfaces adjacent the ends thereof, an axle bearing mounted in said wedge member, opposed supports for pivot bearing means seated on said wedge member, said opposed supports being disposed in said housing for radial movement toward and away from wedge member and held against axial movement therealong, pivot bearing means mounted on said supports and disposed in said spindle supporting the same for pivotal movement about a vertical axis, said wedge member including opposed eccentric surfaces of wedging characteristics in relation to said supports such that axial movement of the wedge member causes radial movement of said pivot bearing means into alined seating and adjustment.

6. A steerable vehicle wheel assembly, an axle housing, an axle mounted in said axle housing, a spindle mounted on an end of said housing for steering movement about a substantially vertical axis, a wheel support drum rotatably mounted on the spindle and arranged in driving connection with said axle, a wedge member mounted in said axle housing and arranged for limited axial movement, said wedge member being supported in said housing on two annular bearing surfaces adjacent the ends thereof, opposed supports including pivot bearing means seated on said wedge member and mounted against axial movement in said housing, said pivot bearing means being radially movably disposed in said spindle for supporting the same for pivotal movement about a vertical axis, said wedge member including opposed eccentric surfaces of wedging characteristics in relation to said supports such that axial movement of the wedge member causes radial movement of the pivot bearing into alined seating and adjustment, and means mounted on said housing cooperatively associated with and for axially moving said wedge member.

7. A device according to claim 6 in which the means mounted on the housing is a nut threadedly engaging the same and arranged to provide movement of said wedge member.

8. In a steerable vehicle wheel assembly having an axle housing encompassing an axle, a spindle mounted on an end of said axle housing and arranged for steering movement about a vertical axis, a wheel support drum rotatably mounted on the spindle and arranged in driving connection with the axle, said spindle being mounted on pivot bearing means for steering movement about a relatively stationary axis relative to said housing, the improvement which comprises a wedge member telescoped in said housing and arranged for limited axial movement, there being opposed wedging surfaces on said wedge member, opposed supports for said pivot bearing means mounted in said spindle and extending to and seated on said wedge member, said supports being mounted in said axle housing against axial movement whereby axial movement of the wedge member causes radial displacement of the pivot bearings in alined seating and adjustment.

9. A device according to claim 8 in which inward axial movement of the wedge member induces outward movement of said opposed supports.

10. In a steerable vehicle wheel assembly having an axle housing encompassing an axle, a spindle mounted on an end of said axle housing and arranged for steering movement about a vertical axis, a wheel support drum rotatably mounted on the spindle and arranged in driving connection with the axle, said spindle being mounted on pivot bearing means for steering movement about a relatively stationary axis relative to said housing, the improvement which comprises a generally tubular wedge member telescoped in said housing and arranged for limited axial movement, there being opposed wedging surfaces on said wedge member, opposed supports for said pivot bearing means mounted in said spindle and extending to and seated on the wedging surfaces of said wedge member and having radial movement with respect to said axle housing, said supports being mounted in said axle housing against axial movement whereby axial movement of the wedge member causes radial movement of the pivot bearing supports, and a variable retainer mounted on said housing arranged to bear against said wedge member to cause axial movement of said wedge member by its movement and otherwise hold said wedge member against axial movement.

11. In a steerable vehicle wheel assembly having an axle housing and a telescoped axle therein, a spindle mounted for steering movement on an end of said housing, a wheel support drum mounted for rotation about said spindle and having driving connection means with said axle, the improvement which comprises said wheel support drum inclusive of inner and outer concentric tubular members interconnected at one end, a pair of opposed pins secured to the inner tubular member and extending through the outer tubular member of the drum, spacer means mounted on each said pin to maintain spacing between said inner and outer tubular members, said pins providing pivotal connections with said driving connection means, and a nut threadedly engaged with said outer tubular member arranged to bear against said spacer means and interconnect said inner and outer tubular member, and a lock nut secured to said pins in bearing relation against said nut forming a unitary spoke assembly for said wheel drum supporting said tubular members against relative movement in radial directions.

12. An assembly according to claim 11 in which the pins are secured to the inner tubular member by threaded engagement with said inner tubular member, providing a demountable unitary spoke assembly for said wheel drum.

13. In a steerable vehicle wheel assembly having an axle housing and a telescoped axle therein, a spindle mounted for steering movement on an end of said housing, a rotatable wheel support drum mounted on bearings disposed on said spindle and a driving connection between the axle and the wheel support drum, the improvement which comprises the wheel support drum including outer and inner concentric tubular members interconnected at one end, a pair of opposed hollow pins secured to the inner tubular member and extending through the outer tubular member and having communication with said bearings, spacer means mounted on each said pin maintaining a predetermined distance between said tubular members, a nut and lock nut assembly threadedly engaged with said outer tubular member arranged to bear against said spacer means and interconnect said inner and outer tubular member, rotary seal means enclosing the bearings between said drum and spindle, seal means between said housing and said spindle, a seal on the open end of one of said pins, and a grease fitting on the other whereby lubricant under pressure may be injected into the bearings of said assembly and be maintained therein for operation.

14. In a steerable vehicle wheel assembly having an axle housing enclosing an axle, a spindle mounted over an end portion of said housing, a wheel support drum rotatably mounted on the spindle and in driving connection with the axle, said spindle being supported on said housing by pivot bearing means for steering movement about a substantially vertical axis, the improvement which comprises a wedge member telescoped in said housing and arranged for limited axial movement, said wedge member including opposed eccentric surfaces, opposed supports for said pivot bearing means mounted in said housing inclusive of complementary surfaces seated on said eccentric surfaces such that axial movement of the wedge causes alined seating and adjustment of the opposed supports and pivot bearings carried thereon, bearing members constituting the mounting of said wheel support drum on said spindle and mounting said drum for rotation therearound, said pivot bearing means and said bearing members being in communication with each other, first seal means extending between said spindle and said housing and second seal means extending between said spindle and said drum assembly arranged to enclose said bearing means and said bearing members so as to maintain lubricant under pressure therein, a pair of hollow pins passing through said drum communicating with said pivot bearing means, a seal on the open end of one of said pins, and a grease fitting on the other said pin whereby lubricant under pressure may be injected into the said enclosure for said pivot bearing means and said bearing member and be maintained therein for operation, and means mounted for selective positioning on said assembly cooperative with said wedge member for causing axial movement thereof for alined seating and adjustment.

15. In a steerable vehicle wheel assembly having an axle housing enclosing an axle, a spindle mounted over an end portion of said housing, a wheel support drum rotatably mounted on said spindle and in driving connection with the axle, and said spindle being supported on pivot bearing means for steering movement about a substantially vertical axis, the improvement which comprises a wedge shaped member telescoped in said housing and arranged for limited axial movement, said wedge member including opposed eccentric surfaces, opposed supports for said pivot bearing means mounted in said housing and inclusive of complementary surfaces seated on said eccentric surfaces such that axial movement of the wedge member causes alined seating and adjustment of the opposed supports and the pivot bearing means carried thereon, the wheel support drum being mounted on second bearing means which are in communication with the first bearing means and are carried by said spindle and mounting said drum for rotation therearound, first rotary seal means between said drum and spindle, second seal means extending between the spindle and the housing, said first and second sealing means enclosing both said bearing means and arranged to maintain lubricant under pressure therein, a pair of hollow pins passing through the drum and communicating with the pivot bearing means, and said second bearing means, a seal on the open end of one of said pins, a grease fitting on the other said pin whereby lubricant under pressure may be injected into the bearings of the assembly and be maintained therein for operation, and means mounted on said housing for selective positioning and cooperative action with said wedge member for causing axial movement thereof for alined seating and assembly.

16. In a steerable vehicle wheel assembly having an axle housing enclosing an axle, a spindle mounted over an end portion of said housing, said spindle being supported on pivot bearing means for steering movement about a substantially vertical axis, the improvement which comprises a wedge member telescoped in said housing and arranged for limited axial movement, said wedge member including opposed concave surfaces, opposed supports for said pivot bearing means mounted in said housing inclusive of complementary convex surfaces seated on said concave surfaces such that axial movement of the wedge member causes aligned seating and adjustment of the opposed supports and pivot bearings carried thereon, a wheel support drum rotatably mounted on second bearing means carried by said spindle and which are in communication with said pivot bearing means, first seal means extending between said spindle and said housing enclosing said pivot bearing means, second seal means extending between the spindle and said drum enclosing said second bearing means, a pair of hollow pins passing through said drum and communicating with both said bearing means, a rupturable seal on the open end on one of said pins, and a grease fitting on the other said pin whereby lubricant under pressure may be injected into the bearings of said assembly and be maintained therein for operation, and means mounted on the housing for selective positioning and properly engaging said wedge member for causing axial movement thereof for said alined seating and adjustment.

17. In a steerable vehicle wheel assembly having an axle housing enclosing an axle, a spindle mounted over an end portion of said housing, a wheel support drum rotatably mounted on the spindle and in driving connection with the axle said spindle being supported on pivot bearing means for steering movement about a substantially vertical axis, the improvement which comprises a wedge member telescoped in said housing and arranged for limited axial movement, said wedge member having opposed eccentric convex wedging surfaces, and opposed supports for said pivot bearing means mounted in said housing and inclusive of concave surfaces complementary to said wedging surfaces and adapted to be saddled thereon such that axial movement of said wedge member causes aligned seating and adjustment of the opposed supports and the pivot bearing carried thereon, and means mounted for selective positioning on the housing cooperatively engaging said wedge member for causing axial movement thereof for said alined seating and adjustment.

18. In the assembly of claim 17, said wedge member tapering from one end to the other and said opposed supports tapering in a complementary manner from a thick portion at one end to a thinner portion at the opposite end for seating on the wedging surface of said wedge.

19. In a steerable vehicle wheel assembly having an axle housing enclosing an axle, a spindle mounted over an end portion of said housing, a wheel support member rotatably mounted on the spindle and in driving connection with the axle, said spindle being supported on pivot bearing means for steering movement about a substantially vertical axis, the improvement which comprises a wedge member and a pair of opposed supports telescoped in said housing and said supports arranged for limited radial movement and serving as the sole means of centering said assembly, said wedge member having opposed eccentric wedging surfaces, the opposed supports carrying said pivot bearing means and inclusive of surfaces complementary to said wedging surfaces and adapted to be saddled thereon such that axial movement of said wedge member causes radial movement and aligned seating and adjustment of the opposed supports and the pivot bearing means carried thereon.

References Cited in the file of this patent

UNITED STATES PATENTS

| | | |
|---|---|---|
| 963,609 | Mascord | July 5, 1910 |
| 1,569,311 | Barstow | Jan. 12, 1926 |
| 1,981,963 | McDonald | Nov. 27, 1934 |
| 2,051,474 | Ford | Aug. 18, 1936 |
| 2,333,911 | Alden | Nov. 9, 1943 |
| 2,917,123 | Ainsworth | Dec. 15, 1959 |

FOREIGN PATENTS

| | | |
|---|---|---|
| 834,525 | France | Aug. 22, 1938 |